Nov. 21, 1939.   K. LANGE   2,180,473
MOVING COIL INDUCTION METER
Filed Jan. 24, 1938
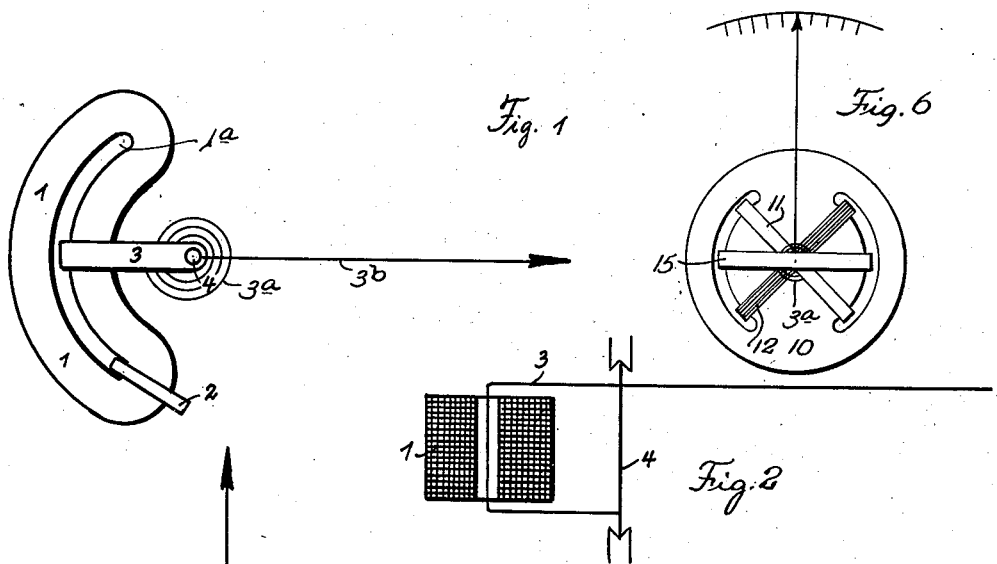
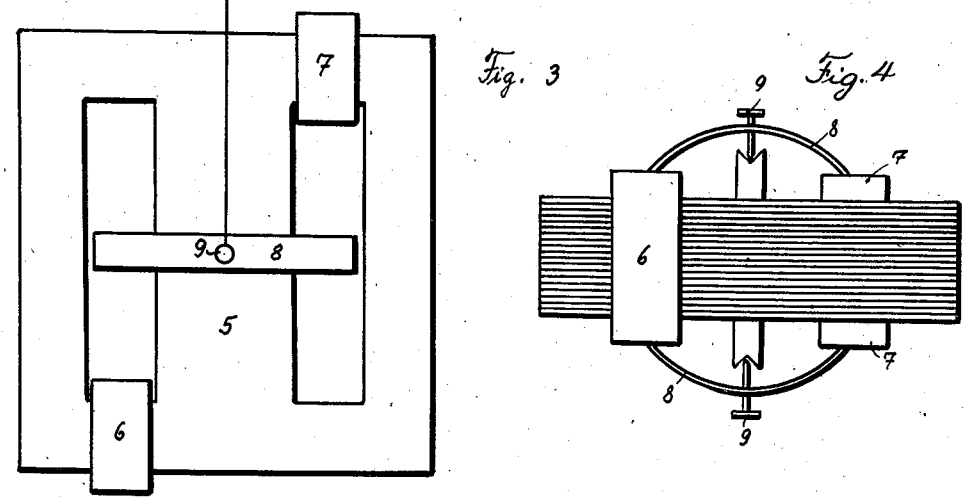
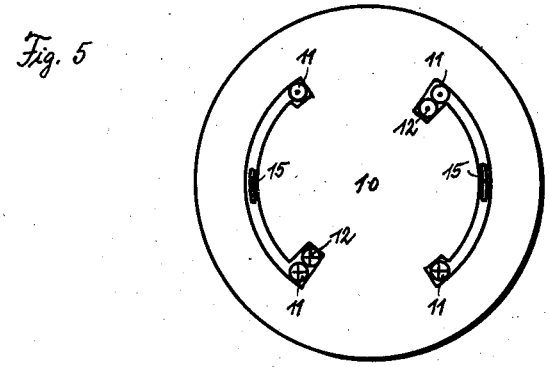
Inventor
Karl Lange Patented Nov. 21, 1939

2,180,473

UNITED STATES PATENT OFFICE 2,180,473

MOVING COIL INDUCTION METER

Karl Lange, Hamburg, Germany

Application January 24, 1938, Serial No. 186,705
In Germany August 4, 1937

3 Claims. (Cl. 171—95)

This invention relates to moving-coil induction meters, and the principal object thereof is to provide an electro-dynamic type galvanometer having a closed iron core forming an air gap, and provided with a winding disposed at one end of the core for producing a field of force in the air gap, also provided with a pivoted coil movable within the air gap in proportion to the repulsive force, the pivoted coil carrying a pointer cooperating with a scale for indicating the instantaneous magnitude of the repulsive force.

By way of introduction reference may be had to a well-known experiment in text books on physics to show the mechanical effect of electromagnetic induction between two coils. A closed coil of wire or a metal ring is laid upon an open coil arranged for connection to a source of alternating current, an iron core being inserted through both in order to intensify the action. Then, when the circuit is closed, the closed coil or ring will be repulsed upwardly. In the case of a transformer having its coils assembled as in the experiment, a short circuit in the secondary winding may give rise to destructive forces between the coils. This would be especially true for a transformer having flat or disk windings lying contiguous one upon the other. It is the purpose of the following description to show a practical application of these induced forces to the measurement of electrical quantities in an alternating current circuit.

I will explain the invention with reference to the accompanying drawing which illustrates several practical embodiments thereof to enable others to adopt and use the same; and will summarize in the claims, the novel features of construction and novel combinations of parts for which protection is desired.

In said drawing:

Fig. 1 is a plan view illustrating a transformer core having an arcuate slot in which the pivoted coil may swing under influence of the primary coil, when excited.

Fig. 2 is a longitudinal section through parts shown in Fig. 1.

Fig. 3 is a plan view showing a modified arrangement.

Fig. 4 is an end view of the modification shown in Fig. 3.

Fig. 5 is a plan view diagrammatically illustrating a further modification.

Fig. 6 is a top plan view of the complete embodiment shown in Fig. 5.

In Figures 1 and 2 it is to be noted that 1 represents the core of a transformer having an arcuate air gap 1a, 2 the exciting or primary coil and 3 the moving or secondary coil pivoted at 4 at the axis of curvature of air gap 1a. The moving coil, which carries a pointer or indicating needle 3b, is brought to rest by a restraining force such as a spring 3a acting in opposition to that of repulsion induced between the coils. Thus, when arranged as in Figs. 1 and 2, the moving coil 3 will turn under excitation on its pivot 4 in the clockwise direction, responding to the smallest changes in the repellent force, the coil 3 assuming always a position corresponding to the magnitude of the alternating current to be measured. It is important to observe that the exciting or primary coil 2 must lie flat and be compressed or confined in the extreme end of the air gap 1a so that the magnetic lines of force proceeding from it will cut the moving coil as nearly as possible at right angles; because the moving coil is, mechanically considered, a lever pivoted at 4 and as such, should turn about its bearing and not be driven against it. For a good range of indication the air gap 1a may be designed long, but it should be kept as narrow as practicable so that a strong stray field can build up between the coils.

In Figures 3 and 4 another form of induction meter is shown in which the moving coil 8 (supported as a double lever pivoted as at 9 in the middle) has two forces acting upon it to make it turn. It is evident that in this way the moving coil 8 is more effective and its bearings subjected less to shocks and strains. 5 shows the laminations of a shell transformer in the air spaces of which the coil 8 is free to move, by turning about its axis 9. As in the previous case the exciting coil 6—7 must be wound flat in the extreme corner of the air space so as to be able to repel the moving coil 8. There being two air spaces, the primary winding is assembled as two sections 6 and 7 disposed in diagonally opposite corners respectively of the core. Coil sections 6 and 7 can thus be made smaller than necessary when a single coil is used. As shown in the measuring instrument of Figures 3 and 4, the air spaces or slots have not their most practical design. It is only the second experimental model, for testing out the diagonal arrangement of the divided winding.

Figure 5 discloses a lamination 10 of still another form of induction instrument with the coils shown in section. Here the design allows the moving coil 15 to be operated on a lower current. Coil sections 11 are arranged in all four corners of the slots. As they produce a radial field across the air gaps, they may be called field coils. These coils alone cannot produce a current in the moving coil, for the algebraic sum of the lines of force cutting it is zero. Therefore in two diagonally opposite corners an additional coil 12 is wound, whose field induces a current in the moving coil, so that it may be called the exciting coil. The direction of the current in the coil windings 11 and 12 is indicated by + and · in Fig. 5. Once excitation is established, the moving coil 15 is not only repelled by the exciting coil 12 but it is simultaneously attracted to the other side by the field coil elements 11. It follows then that, due to the co-operation of the field coils 11, the moving coil 15 itself may be designed for very low currents without affecting the turning moment to an appreciable degree. The field coils 11 and exciting coil 12 may be connected either in series or in parallel, in the latter case as main and shunt circuits. For increasing the range of measurement the windings may also be distributed.

I claim:

1. An electro-dynamometer type galvanometer, comprising a closed iron core forming an air gap; an energizing winding located at one end of the core for producing a field of force through the air gap; a pivoted coil energized by the unknown quantity to be measured and movable within the air gap in proportion to the repulsive force between itself and the field of force, said energizing winding being so disposed that its magnetic lines of force will cut the pivoted coil substantially at right angles; and a pointer and scale for indicating the instantaneous magnitude of such repulsive force.

2. An electro-dynamometer type galvanometer, comprising a closed iron core forming two air gaps; an energizing winding comprising two sections located at the two diametrically opposite ends of the gaps for producing fields of force through the air gaps; a pivoted coil energized by the unknown quantity to be measured and movable within the air gaps in proportion to the repulsive force between itself and the fields of force, said energizing winding being so disposed that its magnetic lines of force will cut the pivoted coil substantially at right angles; and a pointer and scale for indicating the instantaneous magnitude of such repulsive force.

3. In combination with an electro-dynamometer type galvanometer as set forth in claim 2, field coils arranged to produce radial fields across the air gaps for maintaining a substantial turning moment of the pivoted coil under the influence of relatively low currents in the pivoted coil.

KARL LANGE.